United States Patent
Lee et al.

(10) Patent No.: US 12,206,808 B2
(45) Date of Patent: Jan. 21, 2025

(54) ELECTRONIC DEVICE INCLUDING ANTENNAS FOR DETECTING SIGNAL INDICATING WHETHER A COVER IS ATTACHED TO THE ELECTRONIC DEVICE AND A COVER CONFIGURED TO COVER THE ELECTRONIC DEVICE

(71) Applicant: Samsung Electronics Co., Ltd., Suwon-si (KR)

(72) Inventors: Muyeol Lee, Suwon-si (KR); Jeongsik Kim, Suwon-si (KR); Bongsub Kim, Suwon-si (KR); Bowoong Seo, Suwon-si (KR); Hyukjin Jung, Suwon-si (KR); Hyunsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 338 days.

(21) Appl. No.: 17/696,613

(22) Filed: Mar. 16, 2022

(65) Prior Publication Data

US 2022/0303368 A1 Sep. 22, 2022

Related U.S. Application Data

(63) Continuation of application No. PCT/KR2022/003678, filed on Mar. 16, 2022.

(30) Foreign Application Priority Data

Mar. 16, 2021 (KR) .................. 10-2021-0034221

(51) Int. Cl.
*H04M 1/02* (2006.01)
*H01Q 5/25* (2015.01)
*H01Q 9/04* (2006.01)

(52) U.S. Cl.
CPC .............. *H04M 1/026* (2013.01); *H01Q 5/25* (2015.01); *H01Q 9/0407* (2013.01); *H04M 2250/12* (2013.01)

(58) Field of Classification Search
CPC .. H01Q 1/24; H01Q 1/38; H01Q 5/25; H01Q 9/04; H01Q 9/0407; H01Q 1/021;
(Continued)

(56) References Cited

U.S. PATENT DOCUMENTS 9,627,754 B2 * 4/2017 Na .................. H01Q 5/001
2013/0102367 A1 4/2013 Kong
(Continued)

FOREIGN PATENT DOCUMENTS

KR 10-2013-0043556 A 4/2013
KR 10-2014-0107949 A 9/2014
(Continued)

OTHER PUBLICATIONS (CN 106973166 A) >>> A Method And Electronic Device For Providing Content Corresponding To The Accessory (see title) (Year: 2017).*
(Continued)

*Primary Examiner* — Meless N Zewdu

(57) ABSTRACT

An electronic device including an antenna implements a method for recognizing whether a case is attached to the electronic device by using the antenna. The electronic device is configured to attach to an electronic device cover which may include: a cover part configured to surround at least a portion of a housing of the electronic device or form at least a portion of a rear plate of the electronic device; and at least one conductive member configured to, when the electronic device is attached to the cover part, at least partially overlap at least two antennas arranged inside the electronic device and spaced apart from each other. A coupling between at (Continued)

least one of the at least two antennas and the at least one conductive member may be used to recognize whether the electronic device is attached to the cover part.

20 Claims, 13 Drawing Sheets

(58) Field of Classification Search
CPC ........ H01Q 1/523; H01Q 3/2617; G06F 3/01; H02J 50/10; H02J 7/02; H02J 50/005; H04B 1/38; H04B 1/02; H04B 1/103; H04B 1/034; H04B 1/06; H04B 5/00; H04B 5/22; H04B 5/24; H04B 5/26; H04B 5/263; H04B 5/45; H04B 5/48; H04B 5/43; H04B 7/04; H04B 7/024; H04B 1/0053; H04B 1/0064; H04B 7/02; H04B 7/022; H04B 5/40; H04M 1/725; H04M 1/026; H04M 2250/12; H04M 1/7246; H04M 1/185; H04M 1/02; H04M 1/18; H04W 4/00; H04W 88/00; H04W 88/02; H04W 88/08; H04W 4/80; H04W 88/06; G02B 6/443; G02B 6/4486; H04Q 1/52; H04Q 17/00; H05K 1/11; H05K 5/03
See application file for complete search history.

(56) References Cited

U.S. PATENT DOCUMENTS

| | | | |
|---|---|---|---|
| 2014/0227026 A1* | 8/2014 | O'Neill et al. | ......... F16B 17/00 |
| 2014/0240253 A1 | 8/2014 | Choi | |
| 2015/0155917 A1* | 6/2015 | Won | ..................... H04B 5/0031 |
| 2015/0323963 A1* | 11/2015 | Tokutake | .............. G06F 1/1677 |
| 2016/0231845 A1* | 8/2016 | Hayama | ................ G06F 3/0412 |
| 2016/0294429 A1* | 10/2016 | Lebeau | ................ H04B 1/3888 |
| 2017/0019512 A1* | 1/2017 | Guerdrum et al. | . H04M 1/0264 |
| 2017/0025727 A1* | 1/2017 | Yang et al. | ................ H01P 1/18 |
| 2017/0026498 A1* | 1/2017 | Goldfain et al. | ... H04M 1/0249 |
| 2017/0214434 A1 | 7/2017 | Hong | |
| 2018/0123224 A1* | 5/2018 | Jung et al. | ............. H01Q 1/273 |
| 2018/0374448 A1 | 12/2018 | Jeong et al. | |
| 2019/0097302 A1* | 3/2019 | Berge et al. | ............. H01Q 1/22 |
| 2020/0021011 A1 | 1/2020 | Copper et al. | |
| 2020/0296794 A1 | 9/2020 | Park et al. | |
| 2021/0320419 A1* | 10/2021 | Jeong et al. | ........... H04Q 11/08 |
| 2021/0367326 A1* | 11/2021 | Chen et al. | ............ H04Q 1/243 |

FOREIGN PATENT DOCUMENTS

| | | |
|---|---|---|
| KR | 10-2017-0054072 A | 5/2017 |
| KR | 10-2017-0087754 A | 7/2017 |
| KR | 10-2019-0066989 A | 6/2019 |

OTHER PUBLICATIONS (CN 110907934 A) >>> Circular Polarization Automobile Radar For Improved Signal-to-noise Ratio (see title) (Year: 2020).*
(KR 20220101835 A) >>> Antenna and Electronic Device Including the Sam (see title) (Year: 2022).*
(KR 102372187 B1) >>> Electronic Device Comprising Antenna Module Comprising Sensing Electrode (see title) (Year: 2022).*
(WO 2017129433 A1) >>> Capacitive Occupant Classification Sensor With Load-Dependent Antenna Area (see title) (Year: 2017).*
(KR 20210107436 A) >>> Electronic Device Including Electrode in Contact With Body (see title) (Year: 2021).*
(KR 20010060147 A) >>> Automatic Recognition Apparatus for External Accessary of Mobile Radio Terminal (see title) (Year: 2001).*
(KR 20010060147 A), published to Kang Mun Seok, on Jul. 6, 2001, discloses—Apparatus for Automatically Recognizing Outer Accessery in Mobile Radio Terminal Equipment (see title) (Year: 2001).*
International Search Report and Written Opinion of the International Searching Authority dated Jun. 16, 2022, in connection with International Application No. PCT/KR2022/003678, 12 pages.

* cited by examiner

ELECTRONIC DEVICE INCLUDING ANTENNAS FOR DETECTING SIGNAL INDICATING WHETHER A COVER IS ATTACHED TO THE ELECTRONIC DEVICE AND A COVER CONFIGURED TO COVER THE ELECTRONIC DEVICE

CROSS-REFERENCE TO RELATED APPLICATIONS

This application is a continuation of International Patent Application No. PCT/KR2022/003678 filed on Mar. 16, 2022, which claims priority to Korean Patent Application No. 10-2021-0034221 filed on Mar. 16, 2021, in the Korean Intellectual Property Office, the disclosures of which are herein incorporate by reference in their entirety.

BACKGROUND

1. Field

Various embodiments of the disclosure provide an electronic device including an antenna and a method for recognizing whether a case is mounted by using the same.

2. Description of Related Art

In line with development of information/communication technologies and semiconductor technologies, there has been widespread use of various electronic devices at an increasing pace. Particularly, recent electronic devices have been developed to be carried and used for communication. In addition, electronic devices may output stored information as sounds or images. In line with increasing degrees of integration of electronic devices and widespread use of super-fast large-capacity wireless communication, it has recently become possible to equip a single electronic device (for example, mobile communication terminal) with various functions. For example, not only a communication function, but also an entertainment function (for example, gaming), a multimedia function (for example, music/video playback), communication and security functions for mobile banking, a scheduling function, and an electronic wallet function are integrated into a single electronic device. Such electronic devices have become compact such that users can conveniently carry the same.

Meanwhile, the exterior of electronic devices and electronic components included inside electronic devices are vulnerable to external physical/chemical impacts, and accessory cases are widely used to protect the same.

According to an existing embodiment, in order to detect whether an accessory case is attached on an electronic device, a case including a magnet is provided, and a sensor (for example, hall IC) is mounted on the electronic device to detect whether the magnet is proximate. If the accessory case is attached on the electronic device, the magnet on the electronic device generates a hall effect, and the sensor of the electronic device may generate a corresponding signal. A processor included in the electronic device may receive the signal generated by the sensor and determine whether the accessory case is attached. As described above, the magnetic force generated between the magnet and the corresponding sensor is used to determine whether the accessor case is attached. However, multiple electronic components inside the electronic device exhibit performance by the magnetic force between the magnet and the sensor, and thus may be directly affected thereby, and the performance thereof may be severely degraded in some cases. For example, the magnetic force generated between the magnet and the sensor may interfere with radio waves from an antenna mounted inside the electronic device, thereby degrading the performance. In addition, a small electronic device (for example, smartphone) may have a limited space for mounting a sensor for detecting the magnetic force from the magnet of the accessory case. That is, the magnet and the sensor for determining whether the accessory case is attached may restrict design of the electronic device.

Meanwhile, accessory cases attached on electronic devices may be made of materials having various dielectric constants. Accessory cases having various dielectric constants may distort radio waves from antennas according to some embodiments, and this may cause antenna frequency shift. In addition, accessory cases having various dielectric constants may be contributing factors of reduced antenna gain in a specific band or increased AoA (angle of arrival) location determination errors of antennas.

Various embodiments of the disclosure may provide a method for determining whether an accessory case is attached without having a magnet and a sensor corresponding thereto, and a method for determining the same.

Various embodiments of the disclosure may provide an electronic device cover configured such that, even when accessory cases having various dielectric constants are attached on an electronic device, antenna performance is supported such that the same is not degraded.

SUMMARY

Various embodiments disclosed herein may provide an electronic device cover including: a cover part configured to surround at least a portion of a housing of an electronic device or form at least a portion of a rear plate of the electronic device; and at least one conductive member configured to, when the electronic device is attached to the cover part, at least partially overlap at least two antennas arranged inside the electronic device to be spaced apart from each other, wherein coupling between at least one of the at least two antennas and the at least one conductive member is used to recognize whether the electronic device is attached to the cover part.

Various embodiments disclosed herein may provide an electronic device including: a housing; at least two antennas arranged in the housing; and at least one conductive member disposed in a case configured to surround at least a portion of the housing or a rear plate of the housing, and disposed to at least partially overlap the at least two antennas, wherein coupling between at least one of the at least two antennas and the at least one conductive member is used to recognize whether the electronic device is attached to the cover part.

Various embodiments disclosed herein may provide an electronic device including: a housing; at least two antennas arranged in the housing, a processor disposed in the housing and operatively connected to the at least two antennas; and a memory disposed in the housing and operatively connected to the processor, wherein the memory stores instructions, when executed, that cause the processor, when an electronic device cover including at least one conductive member is mounted to the electronic device, to transmit a signal by using at least one antenna of the at least two antennas, disposed adjacent to the at least one conductive member, and to receive a transmitted signal by using the other antenna of the at least two antennas, so as to recognize whether the electronic device cover is attached to the electronic device.

According to various embodiments disclosed herein, it is possible to determine whether an electronic device cover is attached on an electronic device without using a magnetic force measuring sensor (for example, hall IC) and a magnet, thereby preventing degradation of performance of various electronic components included in the electronic device. In addition, manufacturing costs can be reduced because the magnetic force measuring sensor (for example, hall IC) and the magnet are not included, and the electronic device can be designed efficiently.

According to various embodiments disclosed herein, when an electronic device cover is attached on an electronic device, the problem of antenna performance degradation caused by the material of the electronic device cover may be compensated for through a conductive member of the electronic device cover. As another example, when an optimal performance for AoA (angle of arrival) location determination cannot be exhibited due to insufficient antenna mounting space in an electronic device, the AoA location determination performance may be compensated for through a conductive member provided on the electronic device cover.

DETAILED DESCRIPTION

Hereinafter, various embodiments of the disclosure may be described with reference to the accompanying drawings.

Figure 1:
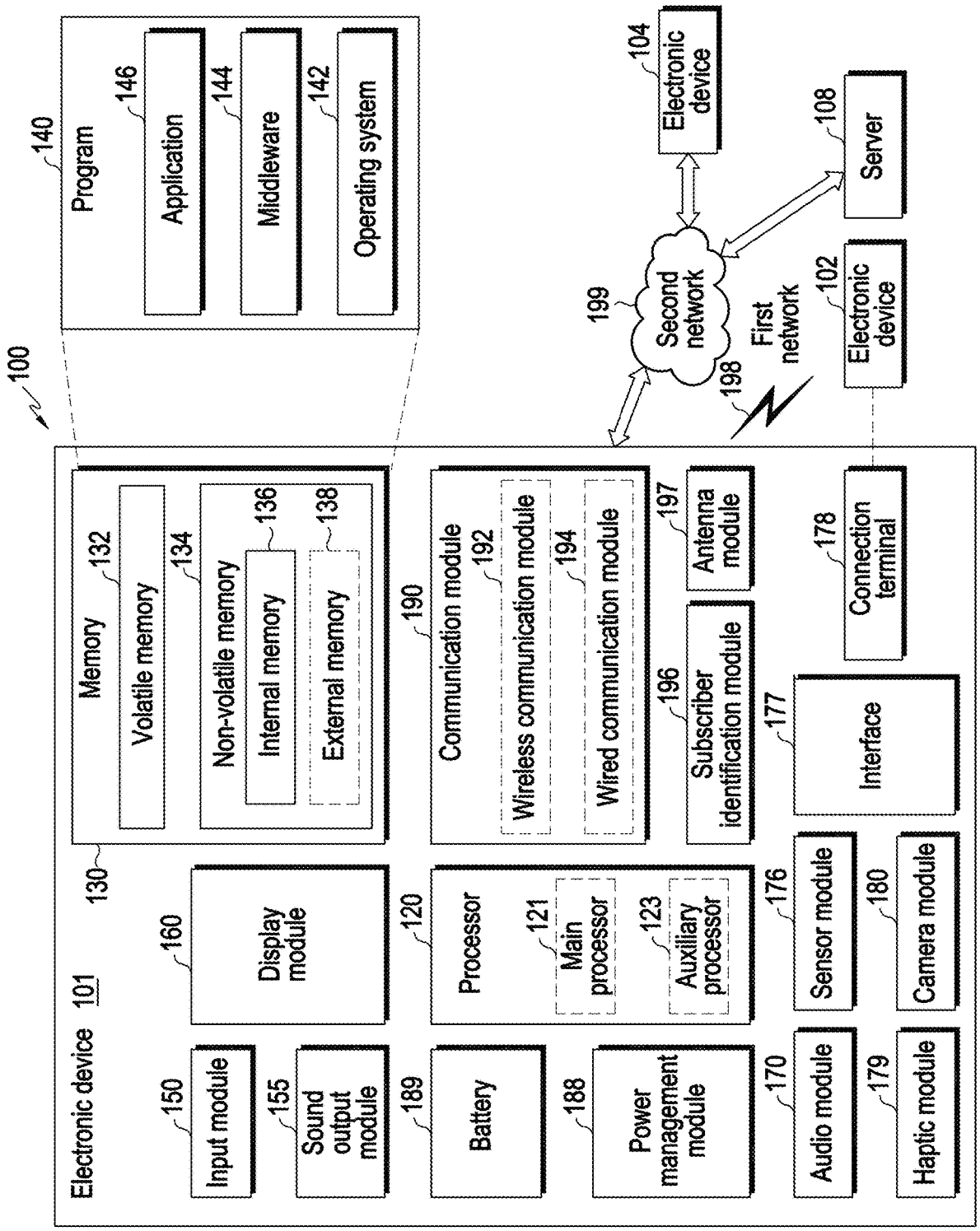
FIG. 1 is a block diagram illustrating an electronic device in a network environment according to various embodiments disclosed herein.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the sub scriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
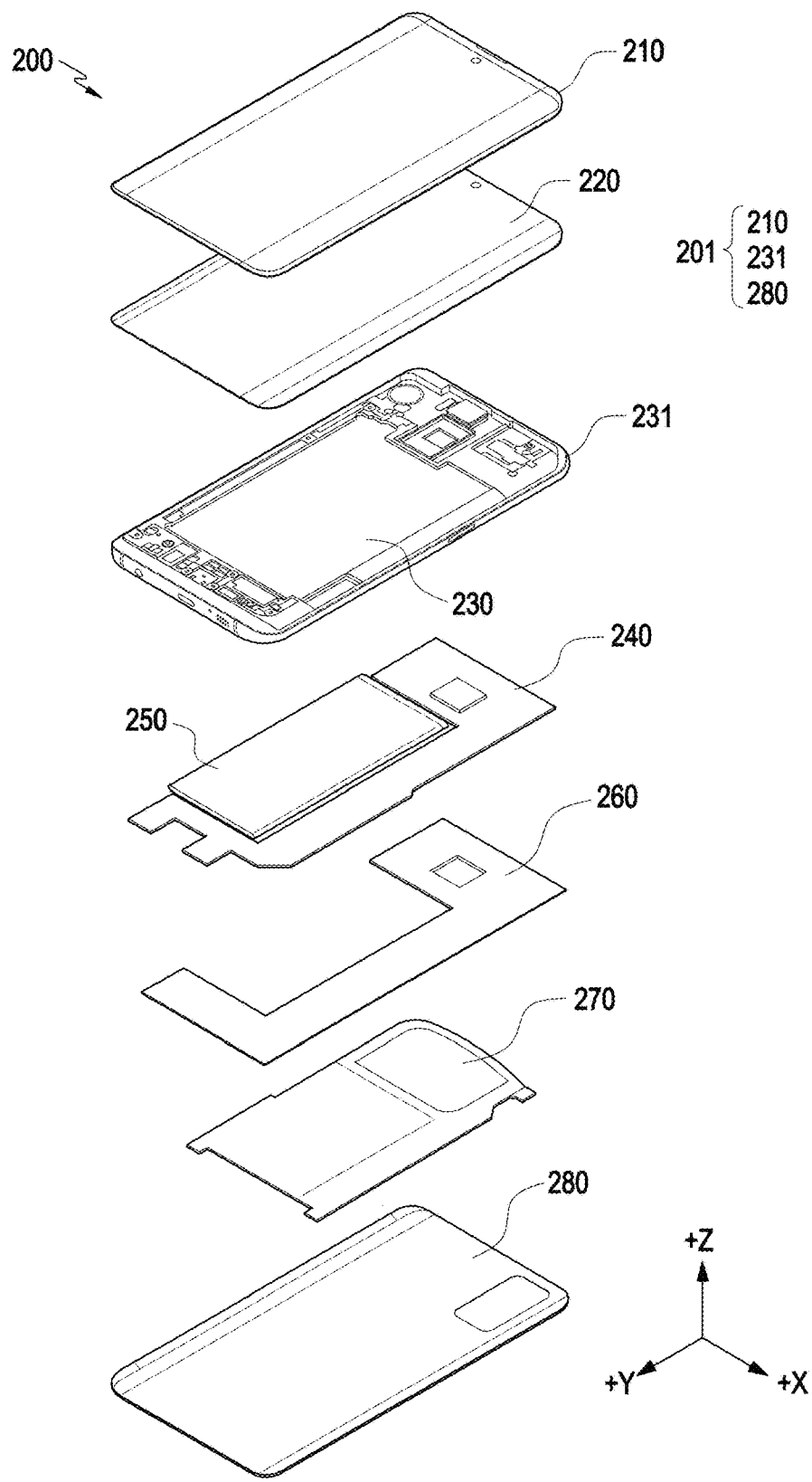
FIG. 2 is an exploded perspective view of an electronic device according to various embodiments disclosed herein.

FIG. 2 is an exploded perspective view of an electronic device 200 according to various embodiments of the disclosure.

In FIG. 2 and following drawings, a direction component +X, a direction component +Y, and a direction component +Z are illustrated. The direction component +X, the direction component +Y, and the direction component +Z may form an orthogonal space coordinate system. The direction component +X may represent a width direction of the electronic device 200, the direction component +Y may represent a length direction of the electronic device 200, and the direction component +Z may represent a height (or thickness) direction of the electronic device 200.

Referring to FIG. 2, the electronic device 200 may include a front plate 210, a display 220, a first support member 230, a main printed circuit board 240, a battery 250, a second support member 260, an antenna 270, and a rear plate 280.

In an embodiment, the electronic device 200 may omit at least one of the components (for example, the first support member 230 or the second support member 260) or additionally include another component.

The electronic device 200 may include a housing 201 including a front surface, a rear surface, and a lateral surface surrounding a space between the front surface and the rear surface. According to an embodiment, at least a portion of the front surface may be formed by the front plate 210 (for example, a glass plate including various coating layers or a polymer plate) at least a portion of which is substantially transparent. The rear surface may be formed of the rear plate 280. The rear plate 280 may be formed by, for example, glass, ceramic, polymers, metals (for example, aluminum, stainless steel (STS), or magnesium), or a combination of at least two of the materials. The lateral surface may be coupled to the front plate 210 and the rear plate 280 and formed by a lateral bezel structure (or "lateral member") 231 including a metal and/or a polymer. In an embodiment, the rear plate 280 and the lateral bezel structure 231 may be integrally formed and include the same material (for example, glass, a metal material such as aluminum, or ceramic).

The display 220 may visually provide information to the outside (for example, a user) of the electronic device 200. The display 220 may include, for example, a display, a hologram device, or a projector, and a control circuit for controlling a corresponding device. According to an embodiment, the display 220 may be visually exposed to outside through, for example, a substantial portion of the front plate 210. According to an embodiment, an edge of the display 220 may be formed to be substantially identical to a shape of an outer periphery adjacent to the front plate 210. The display 220 may include a recess or an opening formed on a part of a screen display area (for example, the front surface), and may include at least one of an audio module, a sensor module, a light-emitting element, and a camera module which are arranged with the recess or the opening. According to an embodiment, the display 220 may include a touch sensor configured to sense a touch or a pressure sensor configured to sense a strength generated by the touch. According to an embodiment (not shown), the display 220 may be combined to or disposed adjacent to a touch sensing circuit, a pressure sensor for measuring a strength (pressure) of a touch, and/or a digitizer for detecting a magnetic field-type stylus pen or a pen.

According to an embodiment, the first support member 230 may be disposed in the electronic device 200 to be connected to the lateral bezel structure 231 or integrally formed with the lateral bezel structure 231. The first support member 230 may be formed of, for example, a metal material and/or a non-metal (for example, a polymer) material. The first support member 230 may have the display 220 coupled to one surface thereof and the printed circuit board 240 coupled to the other surface thereof.

A processor, a memory, and/or an interface may be mounted to the printed circuit board 240. The processor (for example, the processor 120 in FIG. 1) may include, for example, one or more of a central processing device, an application processor, a graphic process device, an image signal processor, a sensor hub processor, or a communication processor.

According to an embodiment, the memory (for example, the memory 130 in FIG. 1) may include at least one component (for example, various data used by a processor or a sensor module) of the electronic device. The data may include, for example, software (for example, a program) and input data or output data with respect to a command related thereto.

According to an embodiment, the interface may include, for example, a high definition multimedia interface (HDMI), a universal serial bus (USB) interface, an SD card interface, and/or an audio interface. The interface, for example, may electrically or physically connect the electronic device 200 to an external electronic device, and may include a USB connector, an SD card/MMC connector, or an audio connector.

According to an embodiment, the battery 250 is a device for supplying power to at least one component (for example, including at least one of a display, a processor, an antenna, an audio module, a light-emitting element, and a camera module) of the electronic device 200, and may include a non-rechargeable primary battery, or a rechargeable secondary battery, or a fuel cell. At least a part of the battery 250 may be disposed on the substantially same plane as the printed circuit board 240. The battery 250 may be disposed and integrally formed in the electronic device 200 or may be disposed to be attachable to/detachable from the electronic device 200.

According to an embodiment, the second support member 260 (for example, a rear case) may be disposed between the printed circuit board 240 and the antenna 270. For example, the second support member 260 may include one surface to which at least one of the printed circuit board 240 or the battery 250 is coupled and the other surface to which the antenna 270 is coupled.

According to an embodiment, the antenna 270 may be disposed between the rear plate 280 and the battery 250. The antenna 270 may include, for example, a near field communication (NFC) antenna, a wireless charge antenna, and/or a magnetic secure transmission (MST) antenna. The antenna 270 may, for example, wirelessly transmit and receive power required for charging or perform near field communication with an external device. For example, the antenna 270 may include a coil for wireless charging. In another embodiment, an antenna structure may be formed by a part or a combination of the lateral bezel structure 231 and/or the first support member 230.

The electronic device 200 disclosed herein has a bar type or a plate type appearance, but is not limited thereto. For example, the electronic device illustrated herein may be a rollable electronic device or a foldable electronic device. The "rollable electronic device" may refer to an electronic device in which a display (for example, display 220 in FIG. 2) is bendable and transformable so that at least a portion thereof can be wound or rolled to be received in a housing (for example, housing 201 in FIG. 2). According to user needs, a screen display area of the rollable electronic device may be expanded to use by unfolding the display or exposing more area of the display to the outside. The "foldable electronic device" may refer to an electronic device in which different two areas of the display may be folded in a direction to face each other or in a direction to face opposite directions from each other. Generally, in a mobile state, the different two areas of the display of the foldable electronic device are folded in a direction to face each other or in a direction to face away from each other, and in an actual use state, a user may unfold the display to make the two different areas form a substantially flat plate shape. In an embodiment, the electronic device 200 according to various embodiments disclosed herein may be interpreted as various electronic devices including a laptop computer or a camera as well as a mobile electronic device such as a smartphone.

Figure 3:
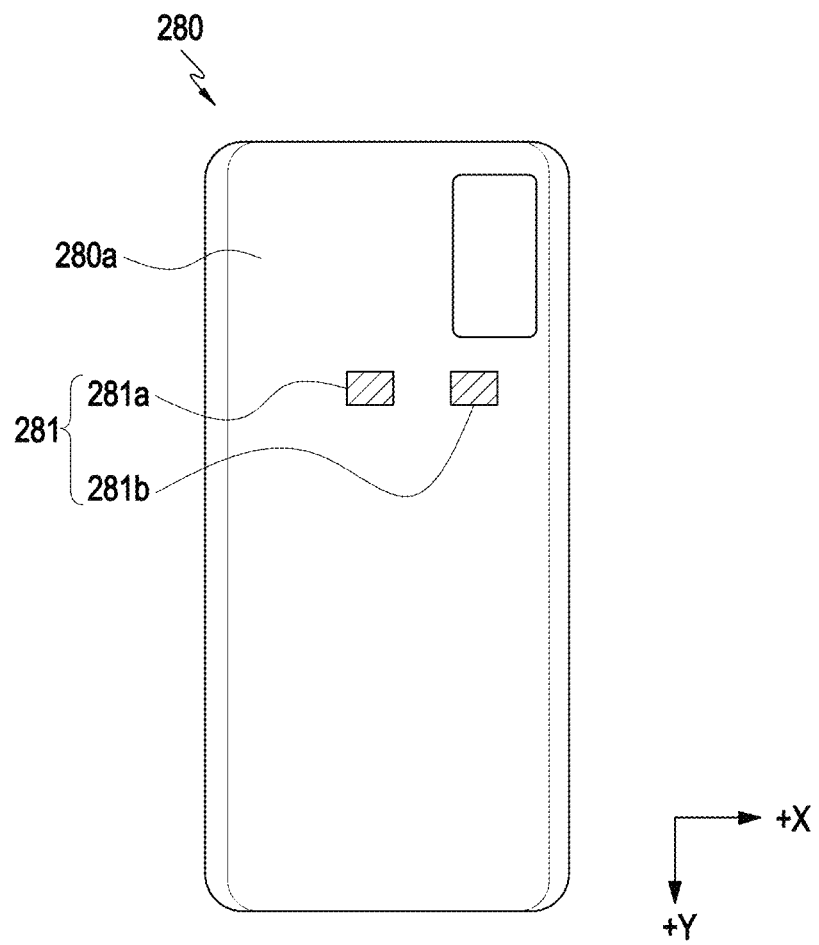
FIG. 3 is a view showing an electronic device cover including a conductive member according to various embodiments disclosed herein.

FIG. 3 is a view showing an electronic device cover 280 including a conductive member 281 according to various embodiments disclosed herein.

According to various embodiments disclosed herein, the electronic device cover may be a portion of a housing (for example, the housing 201 in FIG. 2) of an electronic device (for example, the electronic device 200 in FIG. 2) and correspond to a rear plate (for example, the rear plate 280 in FIG. 2). That is, the electronic device cover 280 is also referred to as rear plate 280. By way of example, as shown in FIG. 3, the electronic device cover 280 may include a cover part 280a configured to form at least a portion of the rear plate of the electronic device (for example, the electronic device 200 in FIG. 2). The cover part 280a may be formed by, for example, glass, ceramic, polymers, metals (for example, aluminum, stainless steel (STS), or magnesium), or a combination of at least two of the materials. In addition, the cover part 280a may include at least one of silicone, urethane, rubber, leather, and fiber or a combination of at least two or more thereof so as to protect the inside of the electronic device from external impact or from scratches on the outer surface.

According to various embodiments, the electronic device cover 280 may be disposed, when the cover part 280a is attached (or assembled) to the electronic device, inside the electronic device and include at least one conductive member 281 to be disposed to at least partially overlap two antennas (for example, the two antennas 234 in FIG. 5A described below) spaced apart from each other.

The conductive member 281 may be configured to be received in the cover part 280a or exposed toward the outside through at least one surface of the cover part 280a, and may be a conductive patch including a metal material according to an embodiment. According to various embodiments, multiple conductive members 281 may be arranged on the cover part 280a, and the multiple conductive members 281 may be spaced apart from each other to form a conductive islands structure (or a floating structure). According to an embodiment, the multiple conductive members 281 may have an arrangement structure forming a specific pattern and the pattern may be correspond to a pattern formed by multiple antennas of the electronic device.

Referring to FIG. 3, two conductive members 281a and 281b are illustrated as an example of the multiple conductive members 281. That is, the conductive member 281 may include a first conductive member 281a and a second conductive member 281b spaced a predetermined distance away from the first conductive member 281a. The size of the first conductive member 281a and the second conductive member 281b and the positions at which the conductive members are arranged may correspond to the size and disposition of the antenna of the electronic device. The detailed description thereof will be given below referring to FIG. 5A. FIG. 3 shows that the first conductive member 281a and the second conductive member 281b are spaced apart in the width direction of the cover part 280a, but is not limited thereto.

Figure 4:
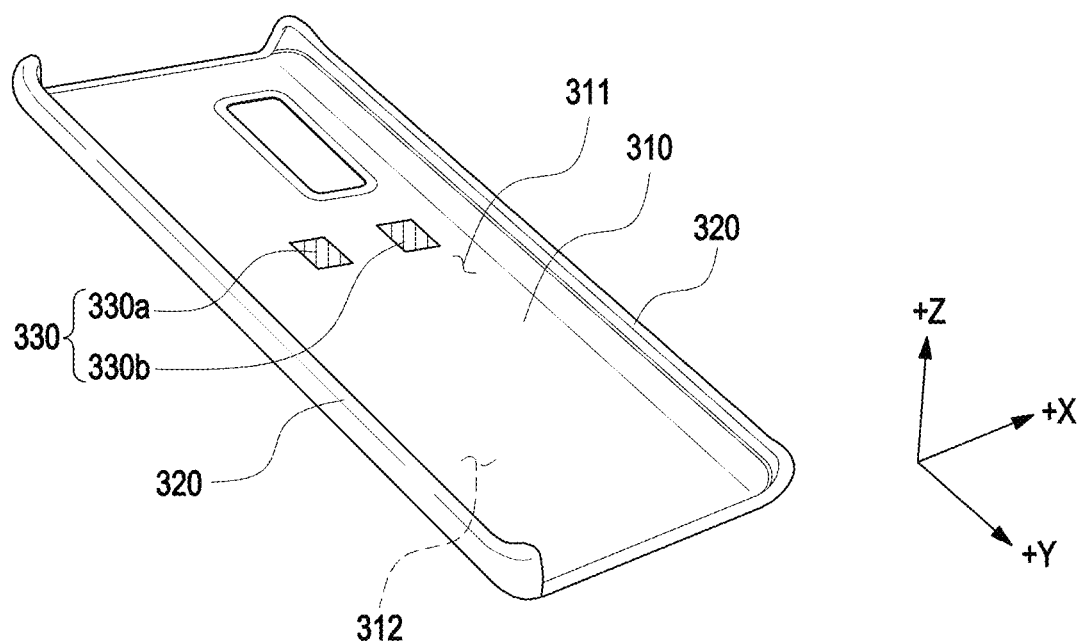
FIG. 4 is a view showing an accessory case including a conductive member according to various embodiments disclosed herein.

FIG. 4 is a view showing an accessory case 300 including a conductive member 330 according to various embodiments disclosed herein.

Referring to FIG. 4, the accessory case 300 according to various embodiments of the disclosure may include a cover part 310 configured to surround at least a portion of an electronic device. The cover part 310 may protect the electronic device from external impact (for example, chemical or physical impact or the like) and provide various hues and texture to the exterior of the electronic device to give an effect of evoking aesthetic sense for a user.

Various types of electronic devices may be attached to the accessory case 300. The electronic devices attachable to the accessory case 300 may include, for example, at least one of a mobile communication device (for example, a smartphone), a tablet personal computer (PC), a mobile phone, an image phone, an e-book reader, a desktop personal computer (PC), a laptop personal computer (PC), a netbook computer, a workstation, a server, a personal digital assistant (PDA), a potable multimedia player (PMP), an MP3 player, a mobile medical device, a camera, or a wearable device. According to an embodiment, the electronic devices attachable to the cover part 310 may include all kinds of electronic devices which are small enough for a user to carry and to which a camera may be disposed on a front or rear plate, or on both plates. Hereinafter, a bar shaped electronic device (for example, a mobile communication device (for example, a smartphone)) will be described as an example of an electronic device attachable to the accessory case 300.

The cover part 310 may include a plate including a front surface 311 and a rear surface 312 facing a direction opposite to the front surface 311, and further include a side member 320 extending from an edge of the plate. The side member 320 may be configured to surround at least a portion of the electronic device. According to an embodiment, the side member 320 may extend toward a direction perpendicular to the edge of the plate. In this case, the side member 320 may have a curved shape while extending in a direction perpendicular to the plate. According to various embodiments, the cover part 310 may additionally include an opening formed therethrough. The opening may be formed at a position corresponding to a rear camera of the electronic device and the rear camera of the electronic device may take a picture in a state of being exposed through the opening.

The accessory case 300 may be used, when attached to the electronic device, in a state in which the cover part 310 overlaps the rear plate (for example, the rear plate 280 in FIG. 2) of the electronic device.

The accessory case 300, according to various embodiments, may be disposed, when the electronic device is attached to the case 300, inside the electronic device and may include at least one conductive member 330 to be disposed to at least partially overlap two antennas (for example, the two antennas 234 in FIG. 5A described below) spaced apart from each other. The at least two antennas may be patch type antennas disposed parallel to the rear plate (for example, the rear plate 280 in FIG. 2) of the electronic device.

The conductive member 330 may be configured to be received in the plate of the cover part 310 or exposed toward the outside through at least one surface of the cover part 310, and may be a conductive patch including a metal material according to an embodiment. Multiple conductive members 330 shown in FIG. 4 may be provided on the cover part 310 similar to FIG. 3. According to an embodiment, the multiple conductive members 330 may configure a pattern which may correspond to a pattern of multiple antennas of the electronic device described below. Referring to FIG. 4, two conductive members 330a and 330b are illustrated as an example of the multiple conductive members 330. That is, the conductive member 330 may include a first conductive member 330a and a second conductive member 330b spaced a predetermined distance away from the first conductive member 330a. The size of the first conductive member 330a and the second conductive member 330b and the positions at which the conductive members are arranged may correspond to the size and disposition of the antenna of the electronic device described below.

As described above with reference to FIG. 3 and FIG. 4, according to various embodiments disclosed herein, the cover including at least one conductive member may have a shape (for example, the electronic device cover 280 in FIG. 3) that forms at least a portion of the rear plate of the electronic device (for example, the electronic device 200 in FIG. 2) or a shape (for example, the accessory case 300 in FIG. 4) that selectively surrounds at least a portion of the housing of the electronic device. Hereinafter, an antenna module for coupling the at least one antenna conductive member will be described with reference to the embodiment shown in FIG. 3.

Figure 5A:
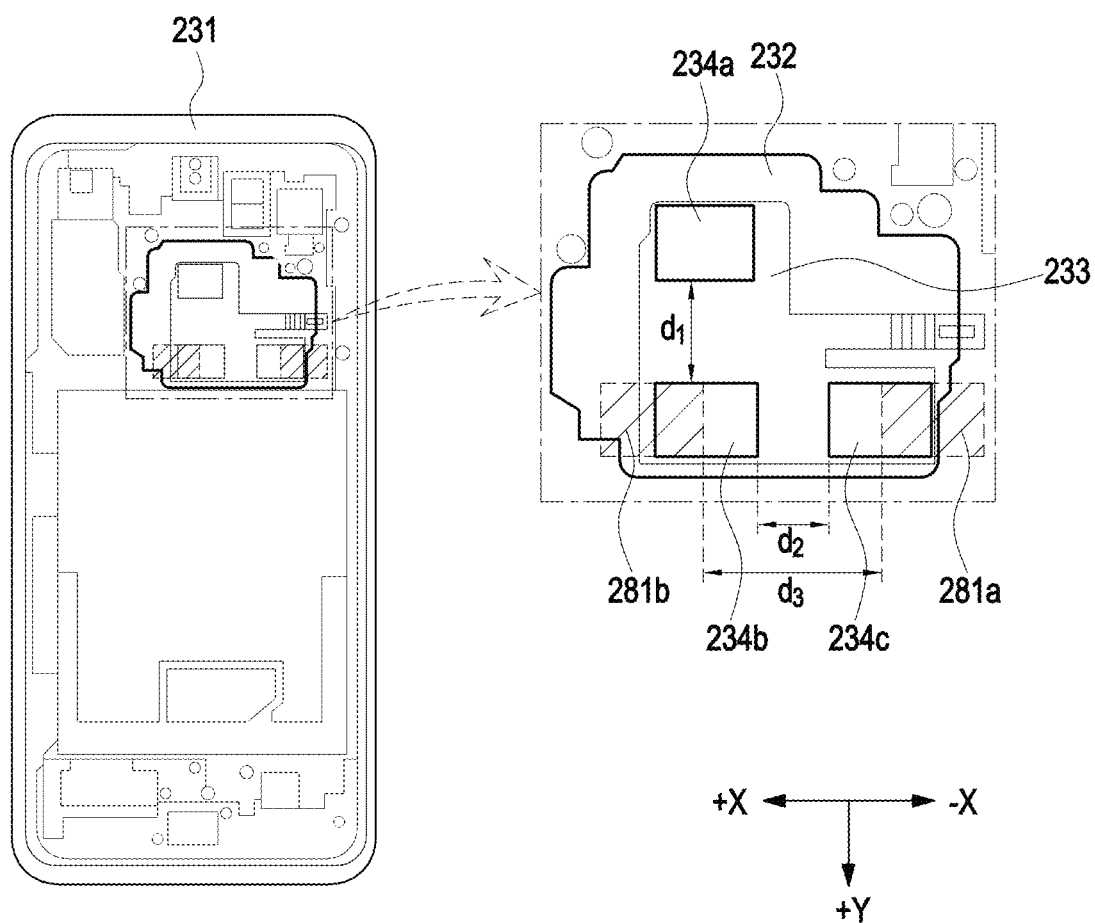
FIG. 5A is a view showing a projected figure of two antennas included in an electronic device and a conductive member provided on an electronic device cover according to various embodiments disclosed herein.
Figure 5B:
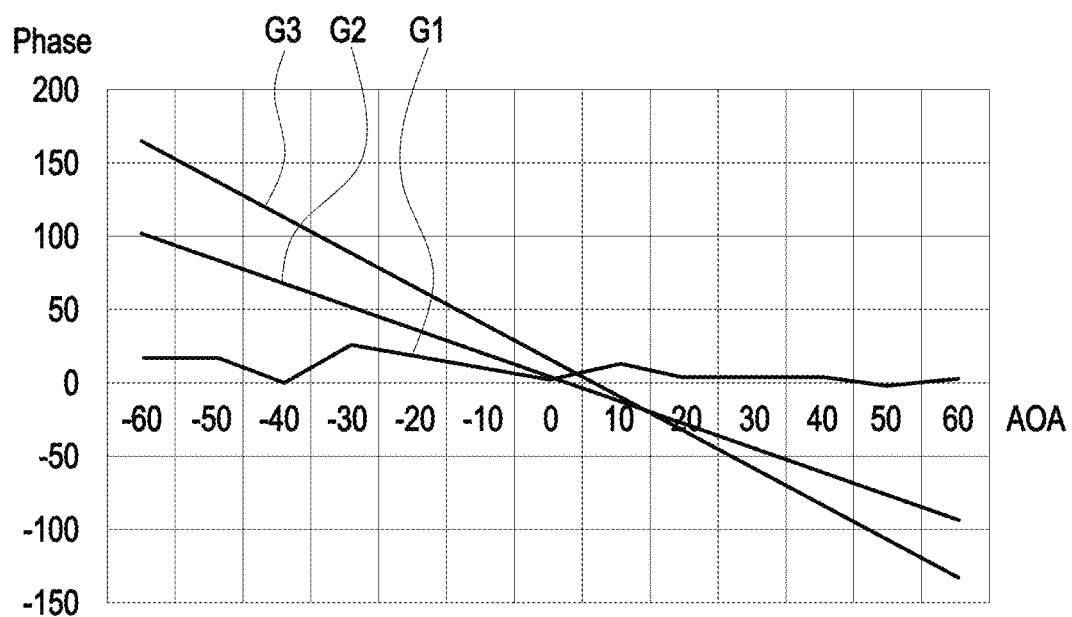
FIG. 5B is a view showing a phase revolution according to an angle of arrival (AoA) with respect to at least two antennas having different spacing distances.

FIG. 5A is a view showing a projected figure of two antennas 234 included in an electronic device (for example, the electronic device 200 in FIG. 2) and a conductive member (for example, the conductive member 281 in FIG. 3) provided on an electronic device cover (for example, the electronic device cover 280 in FIG. 3) according to various embodiments disclosed herein. FIG. 5B is a view showing a phase revolution according to an angle of arrival (AoA) with respect to at least two antennas 234 having different gaps. G1, G2, and G3 in FIG. 5B show a phase resolution according to an angle of arrival (AoA) by feed-to-feed length in a communication environment with respect to a specific frequency channel (CH) having a specific length of wavelength (for example, 36 mm). G1 may show a plot when a feed-to-feed length between two different antennas is formed to be about 5 mm, G2 may show a plot when a feed-to-feed length between two different antennas is formed within about 10 mm, and G3 may show a plot when a feed-to-feed length between two different antennas is formed to be about 18 mm.

Referring to FIG. 5A, an electronic device (for example, the electronic device 200 in FIG. 2) may include an antenna module 232. The antenna module 232 may transmit/receive a signal or power to/from the outside (for example, external electronic device). According to an embodiment, the antenna module 232 may include the antenna 234 including a conductive member formed of a conductor or a conductive pattern formed on the substrate 233. The antenna 234 may be a conductive member included in the electronic device and distinguished from the conductive member 281 disposed in the electronic device cover (for example, the electronic device cover 280 in FIG. 3). In order to clarify the distinction, the antenna 234 may be referred to as a main conductive member and the conductive member 281 disposed in the electronic device cover (for example, the electronic device cover 280 in FIG. 3) may be referred to as a support conductive member configured to be coupled when the main conductive member radiates.

According to various embodiments, the antenna module 232 may include a patch shaped ultra-wideband antenna module. The antenna module 232 supporting an ultra-wideband may include a substrate 233, a UWB IC (for example, the UWB IC 400 in FIG. 9 described below) disposed on one surface of the substrate 233 and capable of supporting a designated wideband, and multiple antennas 234a, 234b, and 234c disposed on one surface of the substrate 233 and capable of transmitting or receiving a signal in a designated wideband frequency. As an example of the multiple antennas, FIG. 5A shows three patch shaped UWB antennas (hereinafter, referred to as "UWB patch antenna"), a first antenna 234a, a second antenna 234b, and a third antenna 234c. Here, the first antenna 234a may make a pair with the second antenna 234b to perform an angle of arrival (AoA) location determination, and the second antenna 234b may make a pair with the third antenna 234c to perform an angle of arrival (AoA) location determination. The "AoA location determination" used herein may be a method for determining a propagation direction of a radio frequency (RF) signal received from a signal transmitter by a signal receiver and determining the location of the signal transmitter. According to an embodiment, the first antenna 234a and the second antenna 234b make a pair with each other to perform AoA location determination in a portrait direction, and the second antenna 234b and the third antenna 234c may make a pair with each other to perform AoA location determination in a landscape direction. FIG. 5A shows both configurations of antennas for performing AoA location determination in the portrait direction and antennas for performing AoA location determination in the landscape direction, but is not necessarily limited thereto. Only one of the configuration (for example, the pair of the first antenna 234a and the second antenna 234b) for performing AoA location determination in the portrait direction and the configuration (for example, the pair of the second antenna 234b and the third antenna 234c) for performing AoA location determination in the landscape direction may be disposed. In addition, according to an embodiment, an additional antenna may be included in addition to the first antenna 234a, the second antenna 234b, and the third antenna 234c. According to an embodiment, the configuration (for example, the pair of the first antenna 234a and the second antenna 234b) for performing AoA location determination in the portrait direction and the configuration (for example, the pair of the second antenna 234b and the third antenna 234c) for performing AoA location determination in the landscape direction are illustrated to be orthogonal to each other, but the disclosure is not limited thereto.

According to various embodiments, the multiple antennas 234a, 234b, and 234c may operate in different frequency domains. The multiple antennas 234a, 234b, and 234c are illustrated to be similar to each other in shape and size in the drawing, but, according to another embodiment, the multiple antennas 234a, 234b, and 234c may be formed to have different sizes, shapes, and/or volumes so as to have different frequency domains.

According to various embodiments, triangulation using at least three antennas may be employed to accurately perform AoA location determination. For example, three antennas (for example, 234a, 234b, and 234c) of the multiple antennas may be used to perform AoA location determination.

According to an embodiment, the antenna module 232 may correspond to the antenna module 197 in FIG. 1. According to various embodiments, the antennas 234a, 234b, and 234c included in the antenna module 232 supporting ultra-wideband may be formed to be spaced a predetermined distance apart from each other. According to an embodiment, the antenna module 232 supporting ultra-wideband may include the antennas 234a, 234b, and 234c configured to receive a UWB frequency signal (for example, about 6.2 G-8.2 GHz) within a pre-configured wavelength range (for example, within $\lambda/2$). According to an embodiment, the antennas 234a, 234b, and 234c may be arranged on one surface of the substrate 233 and formed to have a feed-to-feed length corresponding to $\lambda/2$ (for example, 18 mm) intervals of the used UWB. The "feed-to-feed length" used herein may refer to a feed-to-feed length formed between two different antennas for AoA location determination and may be a concept including an "wire length" that is physically extended and an "electrical length" that is extended through electrical coupling.

For example, the first antenna 234a and the second antenna 234b may be formed to have a feed-to-feed length as long as a first distance (for example, 24 mm), and the second antenna 234b and the third antenna 234c may be formed to have a feed-to-feed length as long as a second distance (for example, 18 mm). According to various embodiments, the feed-to-feed length of a first interval may be proportional to a gap d1 between the first antenna 234a and the second antenna 234b shown in FIG. 5A, and the feed-to-feed length of a second interval may be proportional to a gap d2 between the third antenna 234c and the second antenna 234b shown in FIG. 5A. However, the arrangement relationship of multiple antennas 234a, 234b, and 234c may amount to one example, and is not necessarily limited thereto. Although the gaps between the multiple antennas 234a, 234b, and 234c shown in FIG. 5A are illustrated to be different from each other, the distances of multiple antennas may be formed to be uniform. In addition, contrary to what is shown in FIG. 5A, the multiple antennas 234a, 234b, and 234c may be arranged to be positioned on one line. Various other embodiments may be applied.

The feed-to-feed length is preferable to have a length corresponding to λ/2 of the used UWB. However, it may be difficult to form an ideal feed-to-feed length due to the lack of inter mounting space of the electronic device caused by decreasing in size and integration. According to various embodiments disclosed herein, the electronic device cover (for example, the electronic device cover 280 in FIG. 3) may include the conductive member 281 formed therein to configure a distance between an antenna covering used UWB and an antenna to be similar to the ideal feed-to-feed length.

According to an embodiment, as shown in FIG. 5A, the conductive member 281 disposed in the electronic device cover (for example, the electronic device cover 280 in FIG. 3) may be disposed to overlap at least a portion of the multiple antennas 234a, 234b, and 234c. As described above, multiple conductive members 281 may be provided and include a first conductive member 281a and a second conductive member 281b. In this case, each of the first conductive member 281a and the second conductive member 281b may be disposed to at least partially overlap the multiple antennas 234a, 234b, and 234c. For example, the first conductive member 281a may at least partially overlap the second antenna 234b, and the second conductive member 281b may at least partially overlap the third antenna 234c. However, this is also merely an example and is not necessarily limited thereto. An embodiment showing overlapping between the conductive member 281 and the antenna will be described in detail with reference to FIG. 6A to FIG. 7B below.

In case of general RF communication, an antenna disposed in an electronic device (for example, the electronic device 101 in FIG. 1) having an electronic device cover (for example, the electronic device cover 280 in FIG. 3) attached thereto may have reduced gain, and accordingly the performance of RF communication using the antenna is deteriorated. The gain reduction of a UWB antenna for performing AoA location determination by using two distant antennas may greatly affect AoA location determination deviation and according to an embodiment, the result of AoA location determination itself may be differently measured.

As described in the Background Art, the electronic device cover (for example, the electronic device cover 280 in FIG. 3) may include materials having various dielectric constants. For example, the electronic device cover may include various materials such as leather, silicone, rubber, and/or a polymer. Depending on the material of the electronic device cover attached to the electronic device (for example, the electronic device 101 in FIG. 1), a dielectric constant thereof may cause a large difference in AoA performance. According to various embodiments of the disclosure, the conductive members disposed in the electronic device cover may be adjusted in arrangement intervals and degree of overlap with the antenna so that the AoA location determination performance is not deteriorated by the dielectric constant difference when the electronic device cover is attached to the electronic device.

In relation to AoA location determination performance, when the electronic device cover (for example, the electronic device cover 280 in FIG. 3) having various dielectric constants is not disposed on the two antennas (for example, the first antenna 234a and the second antenna 234b, or the second antenna 234b and the third antenna 234c), the antenna gain may not be reduced. In addition, when the electronic device cover having various dielectric constants is not disposed on the two antennas (for example, the first antenna 234a and the second antenna 234b, or the second antenna 234b and the third antenna 234c), the antenna gain may form a gain graph having a high linearity within an angle range capable of AoA location determination, for example, a field of view (FoV) area (for example, about −60 degrees to +60 degrees). On the contrary, when the electronic device cover (for example, the electronic device cover 280 in FIG. 3) having various dielectric constants is disposed (for example, an electronic device cover including leather), the antenna gain may be reduced and may form a gain graph having a low linearity within a field of view (FoV) area (for example, about −60 degrees to +60 degrees).

The AoA location determination performance may be described as a phase resolution within a field of view (FoV) area (for example, about −60 degrees to +60 degrees) according to a feed-to-feed length between two antennas arranged in the electronic device.

FIG. 5B shows a phase resolution within a field of view (FoV) area (for example, about −60 degrees to +60 degrees) using an antenna disposed in the electronic device (for example, the electronic device 200 in FIG. 2). According to an embodiment, an antenna may retain an AoA determination slope of a predetermined reference (for example, 30 degrees) or more to provide a high phase resolution. When an AoA determination slope does not satisfy a predetermined level, a phase resolution value thus measured may be non-linear.

For example, with respect to a communication channel (ch) according to an embodiment, two antennas (for example, the first antenna 234a and the second antenna 234b, or the second antenna 234b and the third antenna 234c) may be configured to have a frequency wave length of 36 mm for AoA location determination. In this case, the two antennas (for example, the first antenna 234a and the second antenna 234b, or the second antenna 234b and the third antenna 234c) may be preferably configured to have a feed-to-feed length of 18 mm. When the feed-to-feed length between two antennas (for example, the first antenna 234a and the second antenna 234b, or the second antenna 234b and the third antenna 234c) is formed to be about 5 mm or less, the two antennas may have a non-linear phase resolution value of less than 50 as shown in plot G1 in FIG. 5B. When the feed-to-feed length between two antennas (for example, the first antenna 234a and the second antenna 234b, or the second antenna 234b and the third antenna 234c) is formed to be about 10 mm or less, the two antennas may have a linear phase resolution value of 100 or less within a field of view (FoV) area (for example, about −60 degrees to +60 degrees) as shown in plot G2 in FIG. 5B. When the feed-to-feed length between two antennas (for example, the first antenna 234a and the second antenna 234b, or the second antenna 234b and the third antenna 234c) is formed to be about 1 8 mm or less, the two antennas may have a linear phase resolution value of 150 or less within a field of view (FoV) area (for example, about −60 degrees to +60 degrees) as shown in plot G3 in FIG. 5B. The closer the feed-to-feed distance between the antennas to the ideal feed-to-feed distance, the larger the phase resolution value may be. However, it should be noted that the measurement result in the graph representing the phase resolution value is for the purpose of helping the understanding of the disclosure, and may not be absolutely determined by the feed-to-feed distance.

For another example, when with respect to a communication channel (ch) according to an embodiment, two antennas (for example, the first antenna 234a and the second antenna 234b, or the second antenna 234b and the third antenna 234c) are configured to have a frequency wave length of 48 mm for AoA location determination, the two antennas (for example, the first antenna 234a and the second antenna 234b, or the second antenna 234b and the third antenna 234c) have a feed-to-feed distance of about 24 mm so as to have a linear phase resolution value having a high slope.

According to an embodiment, when the feed-to-feed distance of the two antennas (for example, the first antenna 234a and the second antenna 234b, or the second antenna 234b and the third antenna 234c) is formed to be identical or similar to a pre-configured wavelength range (for example, $\lambda/2$), the phase resolution value measured by the electronic device 200 may be linearly measured. The electronic device 200 may be required to perform linear AoA measurement when performing location measurement through UWB communication. According to an embodiment, when the feed-to-feed distance of the two antennas is out of the pre-configured wavelength range (for example, $\lambda/2$), the phase resolution value measured by the electronic device 200 may be non-linear. When the phase resolution value is non-linearly measured, the electronic device 200 may not utilize the pre-measured AoA location determination information. Therefore, the positions of the antenna 234 may be determined in consideration of a gap for measuring a linear phase resolution value.

In summary, with respect to AoA location determination performance, in order to form a gain graph having a high linearity, the two antennas (for example, the first antenna 234a and the second antenna 234b, or the second antenna 234b and the third antenna 234c) have a feed-to-feed length of a value of about ½ the wavelength ($\lambda$) therebetween.

According to various embodiments disclosed herein, when the electronic device cover (for example, the electronic device cover 280 in FIG. 3) having various dielectric constants is disposed on the electronic device (for example, the electronic device 200 in FIG. 2), the use of a coupling between at least one antenna of the at least two antennas and the at least one conductive member may substantially extend the feed-to-feed length, and thereby forming a gain graph having a high linearity. According to an embodiment, the disposition of the electronic device cover (for example, the electronic device cover 280 in FIG. 3) having various dielectric constants on the electronic device (for example, the electronic device 200 in FIG. 2) may lead improvement of AoA location determination performance. According to various embodiments, it is possible to recognize, by using the conductive member provided in the electronic device cover, whether the cover part is attached to the electronic device or not.

Figure 6A:
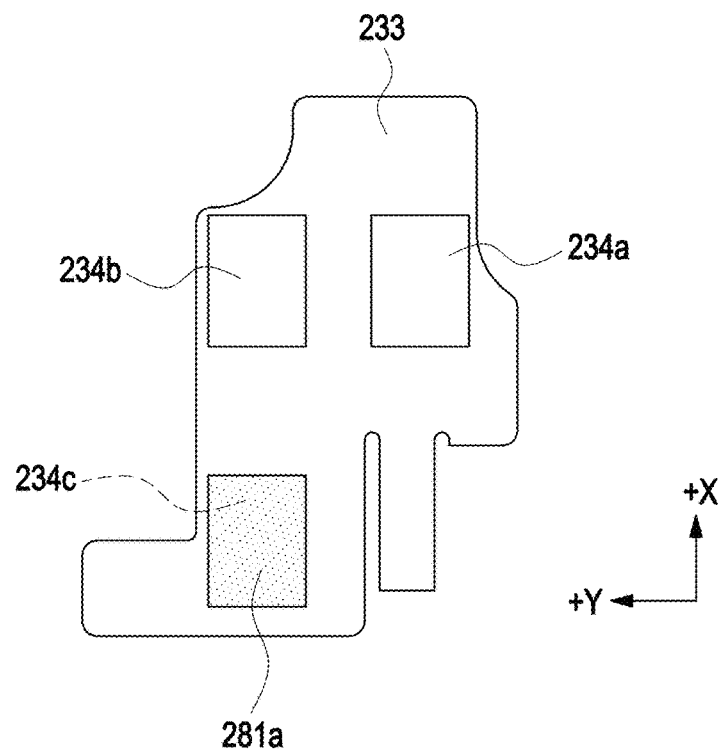
FIG. 6A is a front view showing an antenna and a conductive member completely overlapping each other according to various embodiments disclosed herein.
Figure 6B:
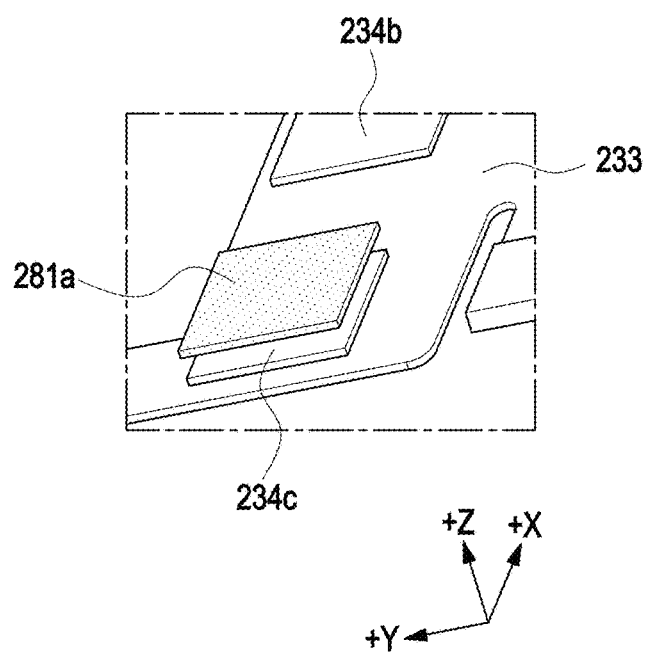
FIG. 6B is a perspective view showing an antenna and a conductive member completely overlapping each other according to various embodiments disclosed herein.

The FIG. 6A is a front view showing an antenna and a conductive member completely overlapping each other according to various embodiments disclosed herein. The FIG. 6B is a perspective view showing an antenna and a conductive member completely overlapping each other according to various embodiments disclosed herein.

Figure 7A:
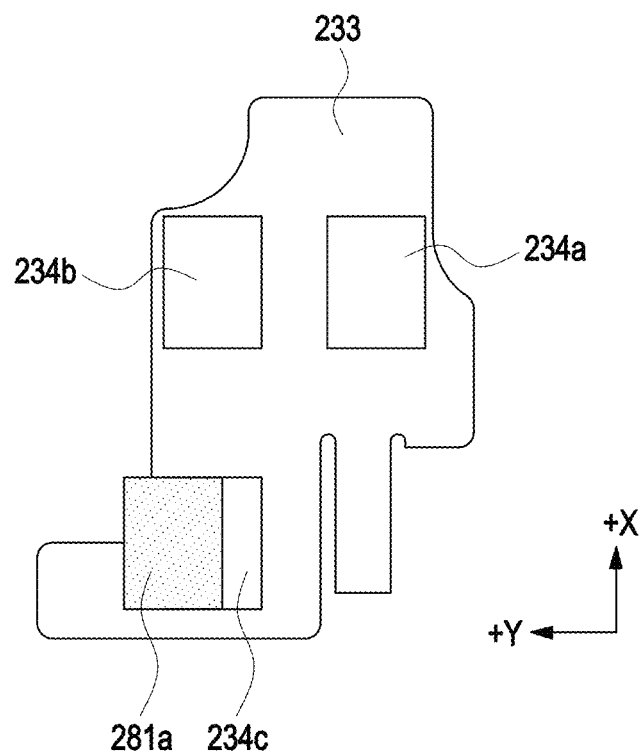
FIG. 7A is a front view showing an antenna and a conductive member partially overlapping each other according to various embodiments disclosed herein.
Figure 7B:
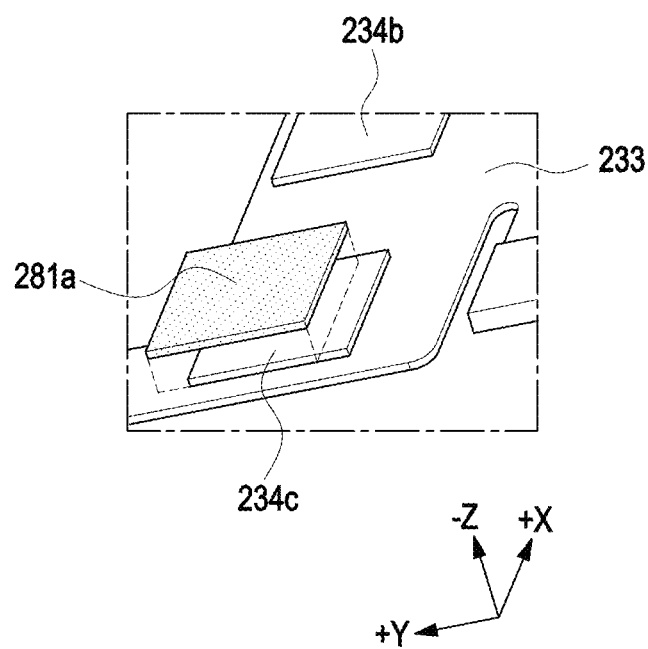
FIG. 7B is a perspective view showing an antenna and a conductive member partially overlapping each other according to various embodiments disclosed herein.

The FIG. 7A is a front view showing an antenna and a conductive member partially overlapping each other according to various embodiments disclosed herein. The FIG. 7B is a perspective view showing an antenna and a conductive member partially overlapping each other according to various embodiments disclosed herein.

Hereinafter, with reference to FIG. 6A to FIG. 7B, various embodiments relating to an overlapping state between at least two antennas and at least one conductive member will be described.

At least one conductive member (for example, the conductive member 281 in FIG. 3) included in an electronic device cover (for example, the electronic device cover 280 in FIG. 3) may be provided so as to recognize the electronic device cover and improve AoA performance in a state in which the electronic device cover is attached. The conductive member (for example, the conductive member 281 in FIG. 3) may be configured to have an identical or similar shape to an antenna so as to radiate UWB communication channel required by the electronic device (for example, the electronic device 101 in FIG. 1) through coupling therebetween. When at least two conductive members are used, the shapes of the two conductive members may be matched to each other so as to form the same radiation pattern. The at least two conductive members may include a first conductive member 281a or a second conductive member 281b. For example, the first conductive member 281a and the second conductive member 281b may have the same shape. For example, the first conductive member 281a and the second conductive member 281b may have the same size, as well. The conductive member 281 included in the electronic device cover (for example, the electronic device cover 280 in FIG. 3) may be overlapped partially or entirely with the antenna of the electronic device.

As shown in FIG. 6A and FIG. 6B, when the conductive member (for example, the first conductive member 281a) of the electronic device cover (for example, the electronic device cover 280 in FIG. 3) is completely overlap the antenna (for example, the third antenna 234c) of the electronic device (for example, the electronic device 101 in FIG. 1), the electronic device (the electronic device 101 in FIG. 1) including the conductive member (for example, the first conductive member 281a) of the electronic device cover may have gain and AoA performance identical or at least similar to those of the case in which the antenna (for example, the third antenna 234c) is not covered by the electronic device cover.

When the conductive member and the antenna of the electronic device overlap in a predetermined area, a frequency shift may occur. For example, as shown in FIG. 7A and FIG. 7B, the conductive member and the antenna of the electronic device overlap in a partial area, about 50 MHz frequency shift may occur, and a position of the conductive member may be adjusted to cause a frequency shift of 50-100 MHz according to an overlapping degree thereof.

According to various embodiments, not shown in drawings, at least one conductive member may be disposed at a corresponding position between the first antenna 234a and the second antenna 234b, and include a conductive member disposed to at least partially overlap the first antenna 234a or the second antenna 234b. According to an embodiment, at least one conductive member may be disposed at a corresponding position between the second antenna 234b and the third antenna 234c, and include a conductive member disposed to at least partially overlap the second antenna 234b or the third antenna 234c.

According to various embodiments, the at least one conductive member may include a first conductive member and a second conductive member corresponding to the first antenna 234a and the second antenna 234b. According to an embodiment, the at least one conductive member may include a first conductive member and a second conductive member corresponding to the second antenna 234b and the third antenna 234c. For example, referring to FIG. 5A again, the first conductive member 281a and the second conductive member 281b are shown, and the first conductive member 281a and the second conductive member 281b may be arranged spaced a pre-configured distance d3 apart from each other.

According to an embodiment, the first conductive member 281a and the second conductive member 281b may have, when the conductive member and the antenna of the electronic device are completely overlapped with each other, a gap therebetween corresponding to the gap between the first antenna and the second antenna (for example, identical to the gap d2 in FIG. 5A and the gap d3 in FIG. 5A).

Figure 8A:
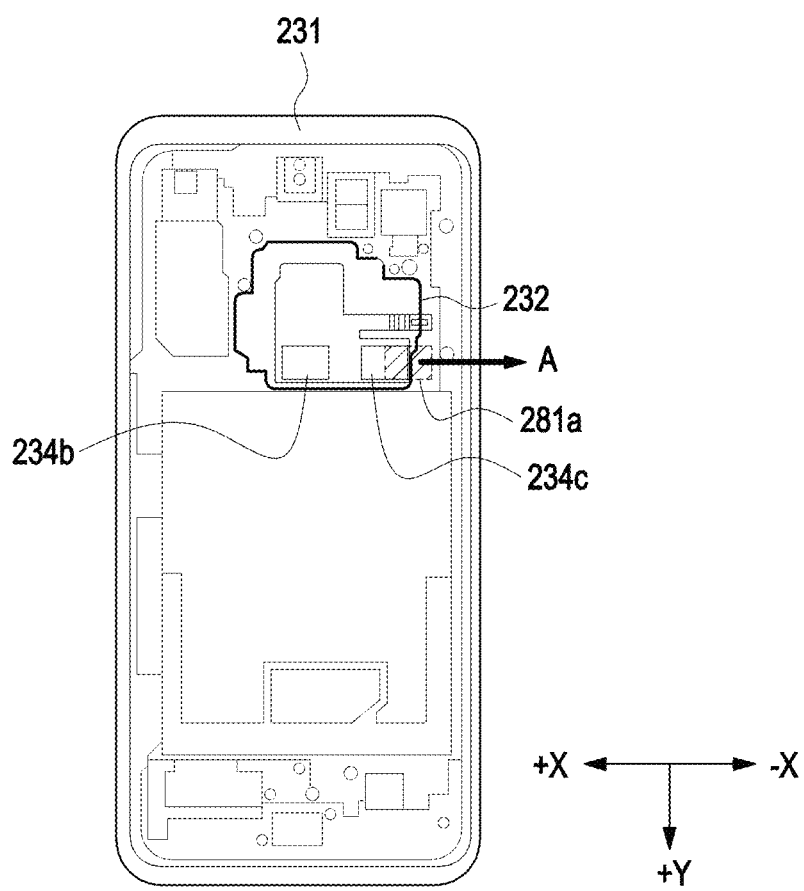
FIG. 8A is a view showing a conductive member projected with respect to two antennas for performing AoA location determination according to various embodiments disclosed herein.
Figure 8B:
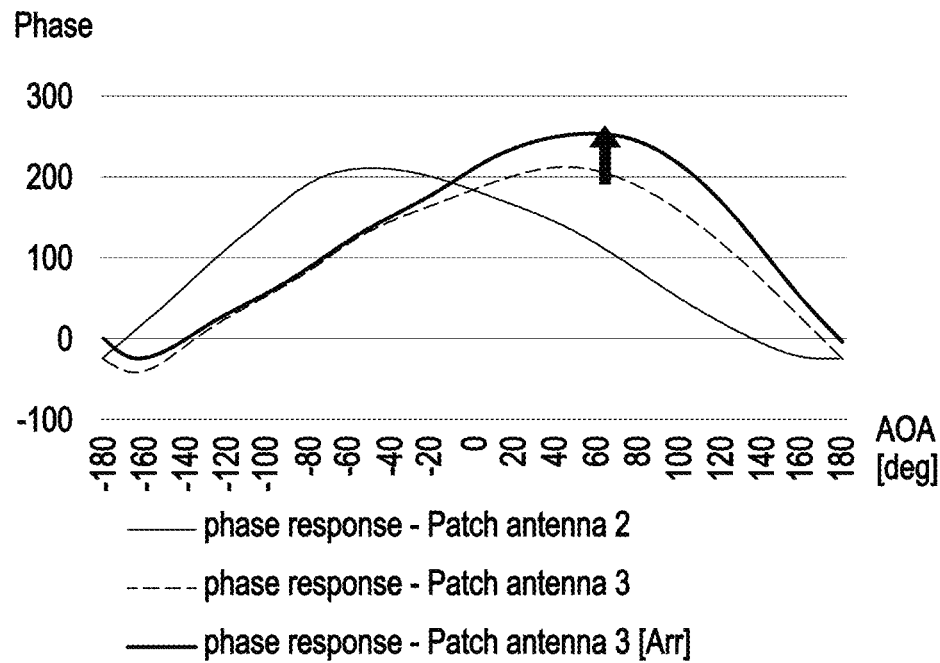
FIG. 8B is a graph showing a phase resolution value change of a second antenna according to a position change of the conductive member shown in FIG. 8A.
Figure 8C:
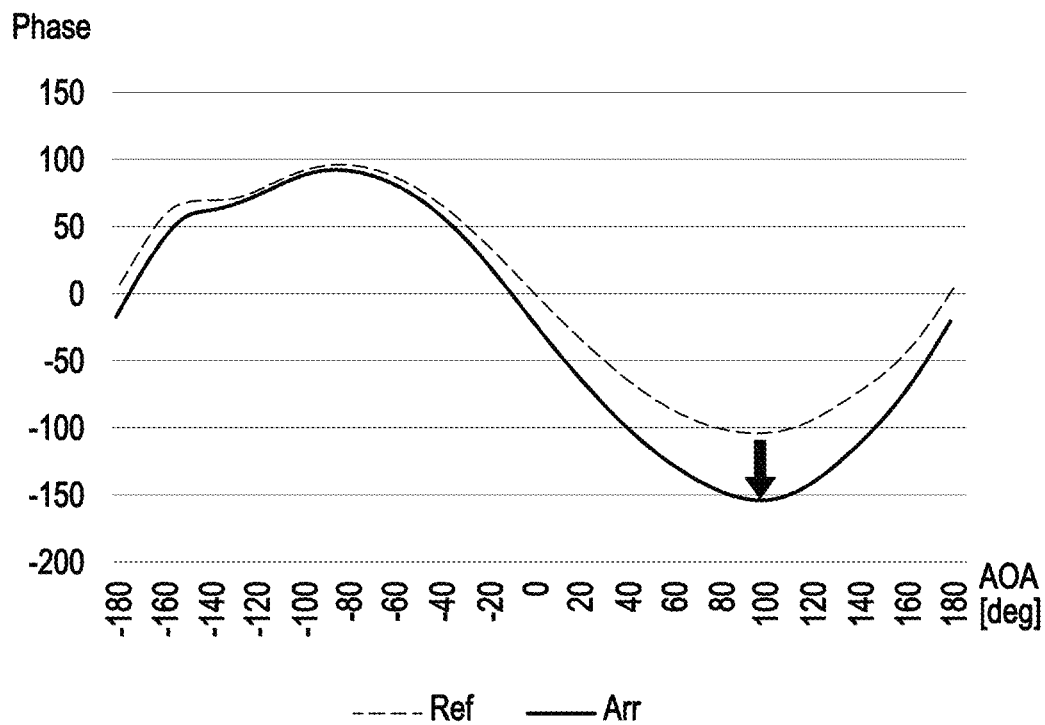
FIG. 8C is a graph showing a synthetic phase resolution value change of a first antenna and second antenna according to a position change of the conductive member shown in FIG. 8A.

FIG. 8A is a view showing a conductive member projected with respect to two antennas for performing AoA location determination according to various embodiments disclosed herein. FIG. 8B is a graph showing a phase resolution value change of a second antenna according to a position change of the conductive member shown in FIG. 8A. FIG. 8C is a graph showing a synthetic phase resolution value change of a first antenna and second antenna according to a position change of the conductive member shown in FIG. 8A.

Referring to FIG. 8A, the example may include the second antenna 234b and the third antenna 234c as two antennas for performing AoA location determination. The second antenna 234b and the third antenna 234c may be arranged spaced a pre-configured distance apart in the antenna module 232. According to an embodiment disclosed herein, the second antenna 234b and the third antenna 234c may be used to perform AoA location determination, and the first conductive member 281a disposed in the electronic device cover (for example, the electronic device cover 280 in FIG. 3) may be included to secure a feed-to-feed length. The first conductive member 281a disposed in the electronic device cover (for example, the electronic device cover 280 in FIG. 3) may be variously positioned according to an embodiment. The electronic device cover (for example, the electronic device cover 280 in FIG. 3) according to an embodiment may include the first conductive member 281a formed at a position shown in FIG. 8A, and the electronic device cover (for example, the electronic device cover 280 in FIG. 3) according to another embodiment may include the first conductive member 281a disposed at a position leaning in −X direction from the position shown in FIG. 8A. Various embodiments of the disposition of the first conductive member 281a may be employed in addition thereto.

FIG. 8B and FIG. 8C show graphs of phase resolution values in the case in which the first conductive member 281a is positioned leaning in −X direction from the position shown in FIG. 8A. FIG. 8B shows a phase resolution value measured through the second antenna 234b and the third antenna 234c, and FIG. 8C shows a synthetic phase resolution value of the second antenna 234b and the third antenna 234c. According to an embodiment, as shown in FIG. 8B, the change of the position of the first conductive member 281a may increase the phase resolution value of the third antenna 234c and as shown in FIG. 8C, an absolute value of the phase resolution value by the second antenna 234b and the third antenna 234c may be collectively increased as well. Like this, according to various embodiments disclosed herein, the change of the position of the conductive member disposed in the electronic device cover may increase the phase resolution value of the antenna of the electronic device and may have an effect of increasing a feed-to-feed length without increasing of an actual distance between the antennas.

According to various embodiments disclosed herein, the coupling between the antenna and the conductive member may be used to recognize whether the electronic device cover (for example, the electronic device cover 280 in FIG. 3) is attached to the electronic device or not. When the electronic device cover includes various electronic device covers having various materials, the electronic device may identify which material is included in the cover attached to the electronic device by measuring various phase resolution values formed by various combinations of the electronic device covers.

Figure 9:
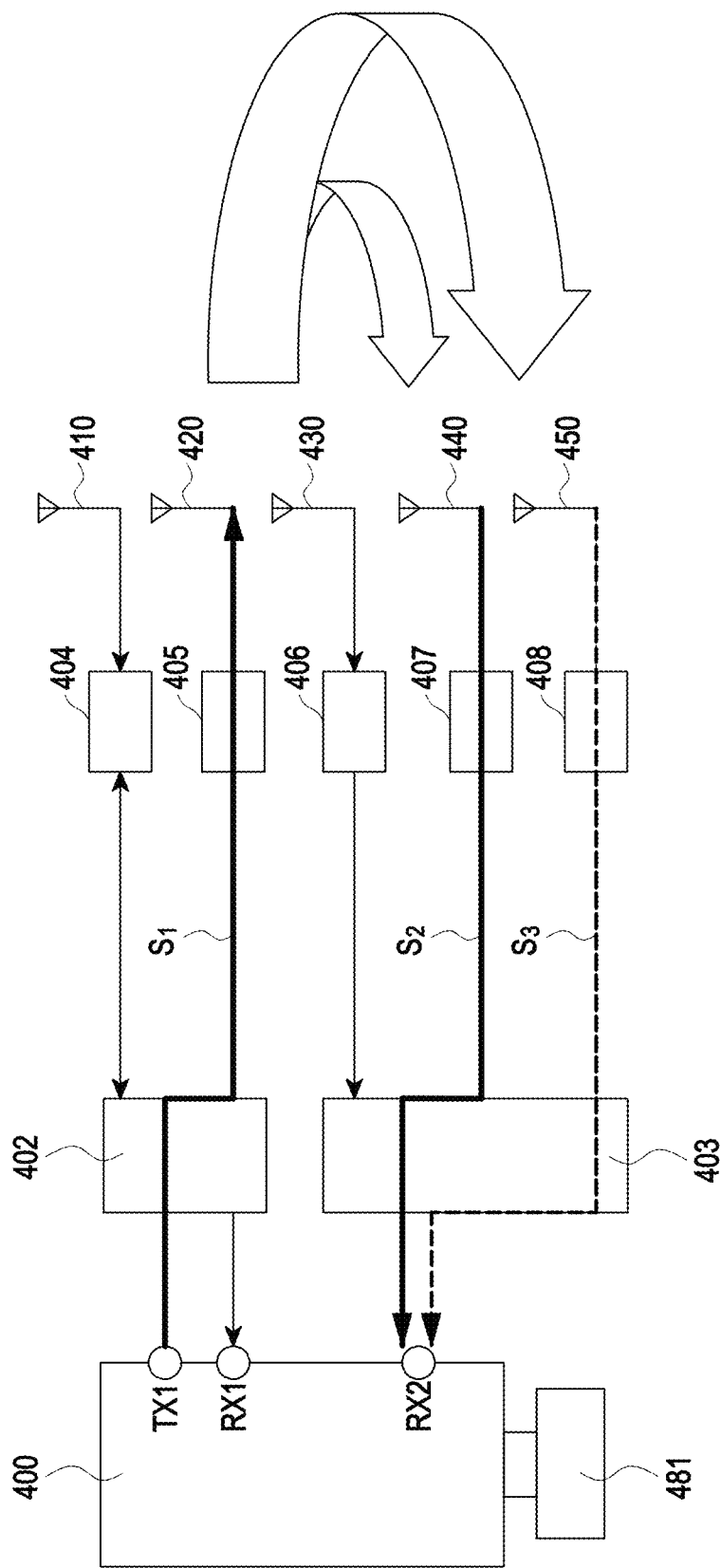
FIG. 9 is a view showing a look back test using an antenna according to various embodiments disclosed herein.

FIG. 9 is a view showing a look back test using an antenna according to various embodiments disclosed herein.

According to various embodiments, an electronic device (for example, the electronic device 200 in FIG. 2) may include a UWB IC 400. According to an embodiment, the UWB IC 400 may be enabled by a processor (for example, the processor 120 in FIG. 1). Referring to FIG. 9, the UWB IC 400 may be included as a chipset form and may include at least one output port (for example, TX1) and at least one input port (for example, RX1 and RX2). The UWB IC 400 may be connected to at least one component. The example of the component may include an oscillator (OSC) 481, a switch 402 and 403, and a filter 404, 405, 406, 407, and 408 in FIG. 9, but is not limited thereto. In addition, the UWB IC 400 may perform a look back test by using the multiple antennas 410, 420, 430, 440, and 450 (for example, the multiple antennas 234a, 234b, and 234c in FIG. 5A) as multiple antenna components. The UWB IC 400 capable of performing a look back test may calculate a frequency shift degree of a specific antenna through the look back test. The multiple antennas connected to the UWB IC 400 may vary according to an embodiment. As shown in FIG. 5A, the multiple antennas may be patch form antennas, metal antennas included in the electronic device, or dipole antennas included in the electronic device. The example of the antenna may vary according to an embodiment. In the look back test, when the electronic device radiates a radio wave by using at least one antenna, the radio wave may be coupled with the conductive member (for example, the conductive member 281 in FIG. 3) disposed in the electronic device cover (for example, the electronic device cover 280 in FIG. 3) and a signal of which a frequency is shifted by the coupling may be received by another antenna of the multiple antennas. Based on at least a portion of the received signal, the attaching of the electronic device cover to the electronic device may be identified. For example, referring to FIG. 9, a signal output from the UWB IC 400 may radiate a radio wave through one antenna 420 of the multiple antennas by using the switch 402 and the filter 405, and the same may be received through at least one other antenna 440 and 450 by using coupling with the conductive member disposed in the electronic device cover. By identifying a frequency shift or phase shift of the reception signal, a dielectric constant of the electronic device cover may be identified and thus a type of the electronic device cover may be specified.

The electronic device (for example, the electronic device 200 in FIG. 2) including the UWB IC may measure gain and a feed-to-feed length for the antenna combination used for AoA measuring in advance for accurate AoA measurement, and selectively apply a location determination compensation value to the actual AoA location determination. According to various embodiments, in relation to the conductive member of the electronic device cover, a compensation table suitable for the electronic device cover may be stored in a memory (for example, the memory 130 in FIG. 1) of the electronic device in advance, and the compensation value for the electronic device cover may be applied when the electronic device cover is attached to the electronic device.

Figure 10:
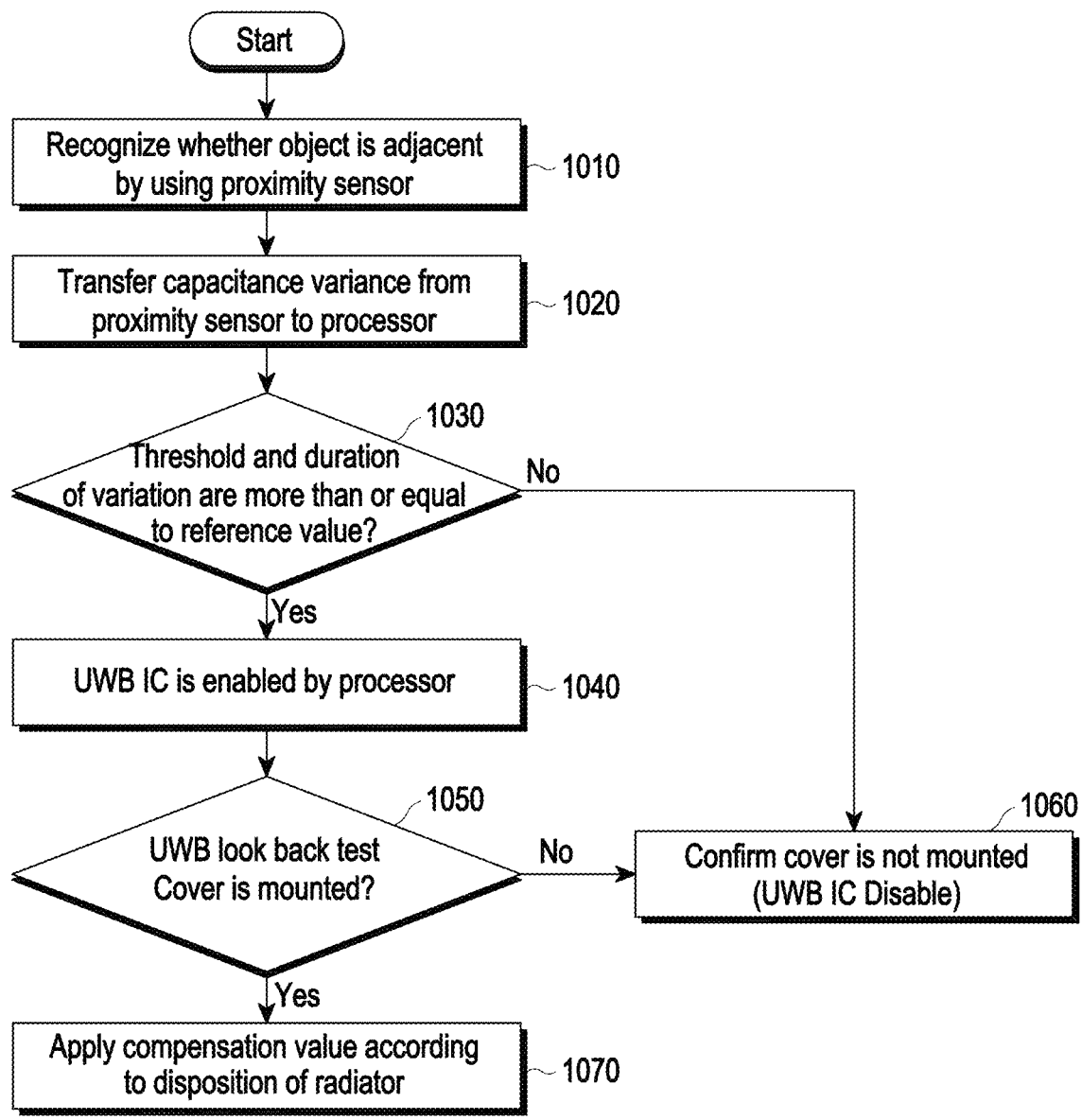
FIG. 10 is a flowchart showing a method for determining whether an accessory case is attached according to various embodiments disclosed herein.
Figure 11:
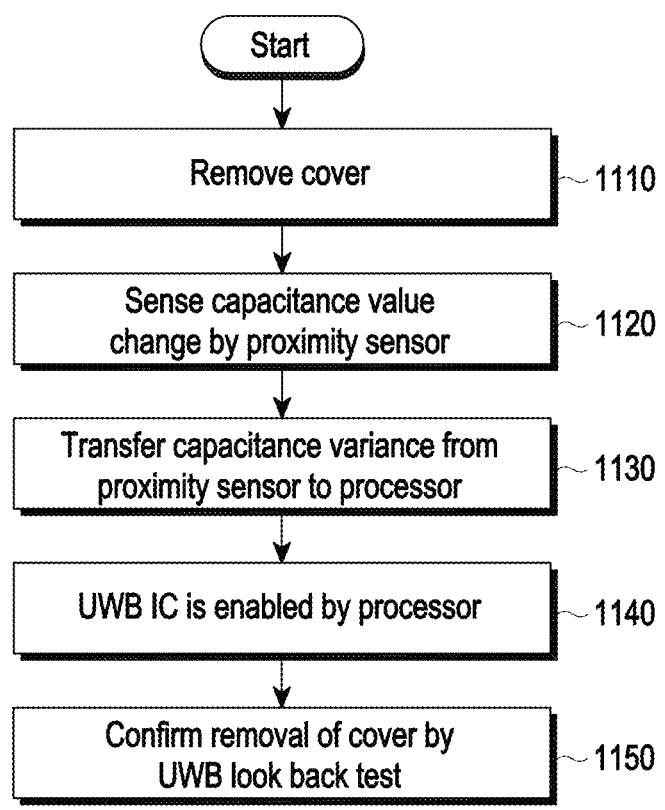
FIG. 11 is a flowchart showing a method for determining whether an accessory case is removed according to various embodiments disclosed herein.

FIG. 10 is a flowchart showing a method for determining whether an electronic device cover is attached according to various embodiments disclosed herein. FIG. 11 is a flowchart showing a method for determining whether an electronic device cover is removed according to various embodiments disclosed herein.

According to various embodiments, a method for determining whether the electronic device cover (for example, the electronic device 280 in FIG. 3) is attached may be implemented by a processor (for example, the processor 120 in FIG. 1) provided in the electronic device. According to an embodiment, the method for determining whether the electronic device cover (for example, the electronic device 280 in FIG. 3) is attached may be implemented by a coprocessor (for example, a UWB IC) provided additionally or alternatively to the processor, in addition to the processor. As described above with reference to FIG. 9, whether the electronic device cover is attached may be determined by including a look back test. The method for determining whether the electronic device cover (for example, the electronic device cover 280 in FIG. 3) is attached may be applied to a method for determining whether an accessory case (for example, the accessory case 300 in FIG. 4) is attached, as well.

According to various embodiments, an electronic device (for example, the electronic device 200 in FIG. 2) may further include at least one proximity sensor. The proximity sensor may include, for example, a grip sensor.

According to various embodiments, the processor (for example, the processor 120 in FIG. 1) may be operatively connected to at least one proximity sensor. The processor may measure, when the at least one proximity sensor recognizes the proximity of an object (for example the electronic device cover 280 in FIG. 3), a capacitance variance according to the proximity of the object. When the capacitance variance is larger than or equal to a predesignated value or the duration of capacitance variation is longer than or equal to a predesignated time, the UWB IC may be woken-up.

Taking FIG. 10 as an example, in relation to operation 1010, the proximity sensor may be used to recognize whether the object (for example, the electronic device cover 280 in FIG. 3) is adjacent to the electronic device. In relation to operation 1020, the proximity sensor may transfer, to the processor, a measured value of the capacity variance according to the proximity of the object. In relation to operation 1030, the processor may determine whether the capacitance variance is larger than or equal to a predesignated value or the duration (for example, about 1 second) of variation is longer than or equal to a predesignated time. In relation to operation 1040, when the capacitance variance is larger than a predesignated value (threshold) and the duration of variation is longer than a predesignated time, an operation for enabling the UWB IC (for example, the UWB IC 400 in FIG. 9) may be performed. In relation to operation 1050, the UWB IC (for example, the UWB IC 400 in FIG. 9) may perform an operation of transmitting a signal by using at least one antenna of the at least two antennas, which is adjacent to the at least one conductive member and perform an operation of receiving a transmitted signal by using at least one other antenna of the at least two antennas, thereby determining whether the electronic device cover is attached to the electronic device. In relation to operation 1060, when the capacitance variance does not exceed a predesignated value (threshold) or the duration of variation does not exceed a predesignated time, the electronic device cover may be determined not to be attached. In relation to operation 1070, when for the conductive member of the electronic device cover, a compensation table suitable for the electronic device cover may be stored in a memory (for example, the memory 130 in FIG. 1) of the electronic device in advance, the compensation value for the electronic device cover may be applied when the electronic device cover including a conductive member is attached to the electronic device.

According to various embodiments, it is also possible to include an operation of measuring a capacitance variance according to a proximity of an object, and waking up the UWB IC by the processor based on the capacitance variance for determining whether the electronic device cover is removed.

Taking FIG. 11 as an example, in relation to operation 1110 and operation 1120, when the electronic device cover is removed, the proximity sensor may be used to recognize whether the object (for example, the electronic device cover 280 in FIG. 3) is adjacent to the electronic device. In relation to operation 1130, the proximity sensor may transfer, to the processor, a measured value of the capacity variance according to the proximity of the object. In relation to operation 1140, when the capacitance variance is less than or equal to a predesignated value, an operation for enabling the UWB IC (for example, the UWB IC 400 in FIG. 9) may be performed. In relation to operation 1150, the UWB IC (for example, the UWB IC 400 in FIG. 9) may perform an operation of transmitting a signal by using at least one antenna of the at least two antennas, which is adjacent to the at least one conductive member and may perform an operation of receiving a transmitted signal by using at least one other antenna of the at least two antennas, thereby determining whether the electronic device cover is removed from the electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments disclosed herein, provided may be an electronic device cover which may include a cover part configured to surround at least a portion of a housing of the electronic device or form at least a portion of a rear plate of the electronic device; and at least one conductive member configured to, when the electronic device is attached to the cover part, at least partially overlap at least two antennas that are arranged inside the electronic device and spaced apart from each other, wherein a coupling between at least one of the at least two antennas and the at least one conductive member may be used to recognize whether the electronic device is attached to the cover part.

According to various embodiments, the at least two antennas of the electronic device may include a first antenna and a second antenna spaced apart to have a feed-to-feed length corresponding to $\lambda/2$ of a used ultrawide band to use.

According to various embodiments, the at least one conductive member may include a conductive member disposed between the first antenna and the second antenna.

According to various embodiments, the at least one conductive member may include a first conductive member and a second conductive member that at least partially overlap the first antenna and the second antenna, respectively.

According to various embodiments, the first conductive member and the second conductive member may be spaced apart from each other by a gap therebetween corresponding to the gap between the first antenna and the second antenna.

According to various embodiments, the at least one conductive member may be a conductive patch having a metal material.

According to various embodiments, the at least one conductive member may be exposed to an outside through at least one surface of the cover part.

According to various embodiments disclosed herein, provided may be an electronic device which may include a housing; at least two antennas arranged in the housing; and at least one conductive member disposed in a cover part configured to surround at least a portion of the housing or disposed in a rear plate of the housing, and wherein the at least one conductive member is configured to at least partially overlap the at least two antennas, wherein a coupling between the at least one of the at least two antennas and the at least one conductive member is used to recognize whether the electronic device is attached to the cover part.

According to various embodiments, the at least two antennas may be ultra-wideband antennas having a patch form and disposed on a substrate part in the housing.

According to various embodiments, at least one proximity sensor may be further included.

According to various embodiments disclosed herein, provided may be an electronic device which may include a housing; at least two antennas arranged in the housing; a processor disposed in the housing and operatively connected to the at least two antennas; and a memory disposed in the housing and operatively connected to the processor, wherein the memory stores instructions, when executed, that cause the processor, when the cover part is attached to the electronic device, to perform an operation of transmitting a signal by using at least one antenna, of the at least two antennas, disposed adjacent to the at least one conductive member, and perform an operation of receiving a transmitted signal by using another antenna of the at least two antennas, so as to recognize whether the cover part is attached to the electronic device.

According to various embodiments, the at least two antennas may be ultra-wideband (UWB) patch antennas disposed on a substrate part in the housing.

According to various embodiments, the at least one proximity sensor may be further included.

According to various embodiments, the processor may include an ultra-wideband integrated circuit (UWB IC) configured to control the at least two antennas.

According to various embodiments, the processor may be operatively connected to the at least one proximity sensor, further configured to: and measure, when in response to determining the at least one proximity sensor recognizes a proximity of an object having an dielectric constant, a capacitance variance according to the proximity of the object, and wake up the UWB IC in response to determining the capacitance variance is greater than or equal to a predesignated value or a capacitance duration of variation is longer than or equal to a predesignated time.

According to various embodiments disclosed herein, provided may be a method for recognizing whether an cover part is attached to an electronic device, the method including an operation of recognizing whether an object is adjacent to the electronic device by using at least one proximity sensor; an operation of transferring a capacitance variance measured by the at least one proximity sensor to a processor; an operation, by the processor, of determining whether the capacitance variance measured by the at least one proximity sensor is greater than or equal to a reference value, determining, by the processor, whether a duration of capacitance variation is longer than or equal to a reference value; when the cover part including at least one conductive member is attached to the electronic device, an operation, by the processor, of transmitting a signal by using at least one of at least two antennas; and an operation, by the processor, of receiving a frequency-shifted signal based on the transmitted signal by using at least one other antenna; and determining whether the cover part is attached to the electronic device based on the received frequency-shifted signal.

According to various embodiments, the processor may include an ultra-wideband integrated circuit (UWB IC) configured to control the at least two antennas.

According to various embodiments, the processor may measure a capacitance variance according to the proximity of the object, and when the capacitance variance is larger than or equal to a predesignated value or the duration of variation is longer than or equal to a predesignated time, wake up the UWB IC.

According to various embodiments, the at least two antennas may be ultra-wideband (UWB) patch antennas disposed on a substrate part in the housing.

According to various embodiments, the processor may include an operation of applying a compensation value for the electronic device cover according to the attaching of the electronic device cover including a conductive member to the electronic device.

As mentioned above, in the detailed description of the disclosure, specific embodiments have been described, but it will be apparent to those of ordinary skill in the art that various modifications are possible without departing from the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device cover comprising:
    a cover part configured to surround at least a portion of a housing of an electronic device or form at least a portion of a rear plate of the electronic device; and
    at least one conductive member configured to, when the electronic device is attached to the cover part, at least partially overlap at least two antennas that are arranged inside the electronic device and spaced apart from each other,
    wherein a coupling between at least one of the at least two antennas and the at least one conductive member is used to recognize whether the electronic device is attached to the cover part.

2. The electronic device cover of claim 1, wherein the at least two antennas of the electronic device comprise a first antenna and a second antenna spaced apart by a feed-to-feed length corresponding to $\lambda/2$ of a used ultrawide band.

3. The electronic device cover of claim 2, wherein the at least one conductive member comprises a conductive member disposed between the first antenna and the second antenna.

4. The electronic device cover of claim 2, wherein the at least one conductive member comprises a first conductive member and a second conductive member that at least partially overlap the first antenna and the second antenna, respectively.

5. The electronic device cover of claim 4, wherein the first conductive member and the second conductive member are spaced apart from each other by a gap corresponding to a gap between the first antenna and the second antenna.

6. The electronic device cover of claim 1, wherein the at least one conductive member is a conductive patch comprising a metal material.

7. The electronic device cover of claim 1, wherein the at least one conductive member is exposed to an outside through at least a surface of the cover part.

8. An electronic device comprising:
    a housing; and
    at least two antennas arranged in the housing,
        wherein the electronic device configured to use a coupling between the at least one of the at least two antennas and at least one conductive member disposed in a cover part, which is configured to surround at least a portion of the housing or disposed in a rear plate of the housing when the cover part is attached to the electronic device, to recognize whether the electronic device is attached to the cover part, and
    wherein the at least two antennas are configured to at least partially overlap the at least one conductive member when the cover part is attached to the electronic device.

9. The electronic device of claim 8, wherein the at least two antennas comprise a first antenna and a second antenna spaced apart by a feed-to-feed length corresponding to $\lambda/2$ of a used ultrawide band.

10. The electronic device of claim 8, wherein the at least two antennas comprise a first antenna and a second antenna, and
    wherein the at least one conductive member comprises a first conductive member and a second conductive member that at least partially overlap the first antenna and the second antenna, respectively.

11. The electronic device of claim 8, further comprising:
    a processor disposed in the housing and operatively connected to the at least two antennas; and
    a memory disposed in the housing and operatively connected to the processor,
    wherein the memory stores instructions, when executed, that cause the processor, when the cover part is attached to the electronic device, to transmit a signal by using at least one antenna of the at least two antennas disposed adjacent to the at least one conductive member, and to receive a transmitted signal by using another antenna of the at least two antennas, so as to recognize whether the cover part is attached to the electronic device.

12. The electronic device of claim 11, wherein the at least two antennas are ultra-wideband (UWB) patch antennas disposed on a substrate part in the housing.

13. The electronic device of claim 12, further comprising at least one proximity sensor.

14. The electronic device of claim 13, wherein the processor comprises an ultra-wideband integrated circuit (UWB IC) configured to control the at least two antennas.

15. The electronic device of claim 14, wherein the processor is operatively connected to the at least one proximity sensor, and further configured to:
    measure, in response to determining the at least one proximity sensor recognizes a proximity of an object having a dielectric constant, a capacitance variance according to the proximity of the object; and wake up the UWB IC in response to determining the capacitance variance is greater than or equal to a predesignated value or a duration of capacitance variation is longer than or equal to a predesignated time.

16. A method for recognizing whether an cover part is attached to an electronic device, the method comprising:
recognizing whether an object is adjacent to the electronic device by using at least one proximity sensor;
transferring a capacitance variance measured by the at least one proximity sensor to a processor;
determining, by the processor, whether the capacitance variance measured by the at least one proximity sensor is greater than or equal to a reference value;
determining, by the processor, whether a duration of the capacitance variation is longer than or equal to a reference value;
when the cover part comprising at least one conductive member is attached to the electronic device, transmitting, by the processor, a signal by using at least one of at least two antennas;
receiving, by the processor, a frequency-shifted signal based on the transmitted signal by using at least one other antenna; and
determining whether the cover part is attached to the electronic device based on the received frequency-shifted signal.

17. The method of claim 16, wherein the processor comprises an ultra-wideband integrated circuit (UWB IC) configured to control the at least two antennas.

18. The method of claim 17, wherein the processor measures a capacitance variance according to a proximity of the object, and when a capacitance variance is larger than or equal to a predesignated value and when a duration of capacitance variation is longer than or equal to a predesignated time, wakes up the UWB IC.

19. The method of claim 16, wherein the at least two antennas are ultra-wideband (UWB) patch antennas disposed on a substrate part in a housing of the electronic device.

20. The method of claim 16, further comprising:
applying, by the processor, a compensation value for the cover part according to the determined attachment of the cover part to the electronic device.

* * * * *